Patented Feb. 5, 1952

2,584,657

UNITED STATES PATENT OFFICE 2,584,657

COATED BASE, THE COATING BEING IN MACROCRYSTALLINE FORM AND COMPOSED OF NORMALLY SOLID FILM FORMING MATERIAL AND TRIOXANE

Peter Arcidiacono, Maplewood, N. J., assignor, by mesne assignments, to Harvel Research Corporation, a corporation of New Jersey No Drawing. Application May 17, 1947,
Serial No. 748,840

11 Claims. (Cl. 117—42)

This invention relates to novel compositions of matter and to various products which may be produced therewith and also to methods for producing said products. In one of its general aspects the invention is directed to novel compositions of matter which may be applied to a base for the production of coatings of attractive patterns and designs. In another of its aspects the invention is directed to the novel products comprising a base having one of said coatings of attractive pattern or design on at least one face thereof. In still another aspect, this invention is directed to the novel method for producing said products.

In the course of my experimentations with coating compositions, I have discovered that liquid combinations of trioxane and a normally solid film forming material may be employed in the production of coatings of attractive patterns or designs. These liquid combinations are produced by providing combinations of trioxane and said normally solid film forming materials in such proportions that the ratio by weight of the trioxane to the normally solid film forming material is greater than 1 to 1 and may be as high as desired. Generally, the ratio by weight of the trioxane to said normally solid film forming material is in the range of 5–3 to 50–1. These various liquid combinations may be applied to a base in thin layers, and upon solidification of the trioxane and the normally solid film forming material, there are provided substantially dry solid coatings of attractive patterns and designs. These coatings may be of various macrocrystalline configurations, such as arboreal, needle-like, fan-shape, fish scale, etc. and may be dull, glossy, mirror-like, pearlescent, etc. The various macrocrystalline configurations or patterns apparently are imparted to the coatings by the crystallization of the trioxane in the combination. While these combinations may be produced by heat dissolving together trioxane and a normally solid film forming material, it is preferable to provide a solution of trioxane and a normally solid film forming material in a mutual solvent. The ratio by weight of the mutual solvent to the combined weights of the trioxane and normally solid film forming material may be as low as required for providing solutions of the required viscosity for application to the base. I prefer that the ratio by weight of the mutual solvent to the normally solid film forming material be at least 5 to 3 in most cases so that the viscosity of the solutions are not too high for most applications. I further prefer that the ratio by weight of the mutual solvent to the combined weights of the trioxane and the normally solid film forming material be no greater than 4 to 1.

The normally solid film forming materials are those which when dissolved in a volatile solvent and the solution thereof is deposited on a base and after evaporation of the solvent therefrom are in the form of a substantially dry film. Examples of the normally solid film forming materials are the normally solid polyvinyl esters, such as polyvinyl chloride, polyvinyl acetate, etc., the normally solid copolymers of the vinyl esters, such as, vinyl chloride and vinyl acetate, the normally solid polyvinyl acetals, such as polyvinyl butyral, polyvinyl formal, polyvinyl acetal, etc., the normally solid acrylic resins, such as the alkyl methacrylates, some of which are the methyl, ethyl, butyl and propyl methacrylates, etc., the normally solid cellulose esters, such as cellulose nitrate, cellulose acetate, cellulose butyrate etc., the normally solid cellulose ethers, such as methyl cellulose, ethyl cellulose, butyl cellulose, etc., normally solid polymers of styrene and styrene derivatives, various corn product proteins, some of which are known as mazeine or zein.

The mutual solvents which I prefer to employ are those having a relatively high vapor pressure. Among some of the solvents which have been found particularly useful are those whose rate of evaporation under working conditions is no lower than that of xylol at atmospheric pressure and room temperature. Some of them which have been found particularly useful are acetone, methyl ethyl ketone, ethyl alcohol, methyl alcohol, benzene, benzol and ethyl acetate.

The novel solutions are produced by dissolving trioxane and one or more of the normally solid film forming materials in one or more of the mutual solvents therefor. This may be accomplished at room or elevated temperature. Then the solution, which may be at either room or elevated temperature, may be applied to the surface of the object to be coated in any convenient manner, as for example by spraying, flowing, dipping and flowing, etc. Then the solvent is removed from the solution coated object whereupon the combination of solutes remains behind as a substantially dry coating of macrocrystalline design apparently imparted to the film forming material by the crystalline material as they both come out of solution in the course of evaporation of the mutual solvent. The solvent evaporation step is preferably carried out at room temperature or if desired at elevated temperatures below the melting point of the crystalline material employed.

The configuration or pattern or design of the substantially dry coating may be varied by varying the nature of the base, using either an absorbent or non-absorbent base, varying the mutual solvent, varying the film forming material, varying the concentration of the solution, varying the ratio of the trioxane to the film forming material, varying the rate solvent evaporation after application of the solution, etc. Thus by controlling these various factors, it is possible to obtain a wide variety of different solutions and a wide variety of different coating designs.

If desired there may be added to the various combinations heretofore set forth other materials, such as pigments or the like. The pigments may or may not be soluble in the mutual solvent and are employed to impart the desired color or tint to the coating.

These various coating compositions may be applied to a wide variety of bases to provide attractively coated bases finding use in a large number of different fields. The base may be composed of wood, paper, cardboard, textiles, glass, metal, stone, ceramic, synthetic plastic and of various other compositions. The finished products find use in the fields of clothing, drapes, shower curtains, wall paper, decorative wrapping paper, trim paper, cabinets, etc.

The following are examples of specific solutions which serve merely to illustrate some of the compositions of this invention which may be used to provide coatings of attractive patterns or designs. These examples are given merely by way of illustration and are not to be construed in a limiting sense, all parts being given by weight.

In most cases the solutions may be produced at room temperature. However, in certain instances in order to hasten solution heat may be applied. External heat was employed in the preparation of solutions 15–17. When no solvent is used the trioxane and the film forming material are heated until solution takes place. An illustrative example of such a product consists of 100 parts of trioxane and 10 parts of a copolymer of vinyl acetate and vinyl chloride known as "VMCH" which when at elevated temperatures form a solution which maintained at elevated temperature may be applied on to a surface to be coated and upon cooling provides a coating of macrocrystalline design.

I claim:

1. A base, a coating on a surface of said base, said coating being the combination of a normally solid film forming material and trioxane, said coating being of macrocrystalline design, said film forming material selected from the group of normally solid materials, consisting of polyvinyl esters, vinyl esters copolymerized with each other, polyvinyl acetals, cellulose ethers and cellulose esters.

2. A base, a coating on a surface of said base, said coating being the combination of (1) vinyl esters copolymerized with each other and (2) trioxane, said coating being of macrocrystalline design.

3. A base, a coating on a surface of said base, said coating being the combination of a normally solid polyvinyl ester and trioxane, said coating being of macrocrystalline design.

4. A base, a coating on a surface of said base, said coating being the combination of a normally solid polyvinyl acetal and trioxane, said coating being of macrocrystalline design.

5. A base, a coating on a surface of said base, said coating being the combination of a normally

| Solution No. | Parts of Trioxane | Parts of Normally Solid Film Forming Material | Parts of Mutual Solvent |
| --- | --- | --- | --- |
| 1 | 100 | Copolymer of vinyl chloride and vinyl acetate known as "VMCH"—20. | methyl ethyl ketone—100. |
| 2 | 100 | Copolymer of vinyl chloride and vinyl acetate known as "VMCH"—10. | methyl ethyl ketone—100. |
| 3 | 100 | Copolymer of vinyl chloride and vinyl acetate known as "VMCH"—40. | methyl ethyl ketone—100. |
| 4 | 100 | Copolymer of vinyl chloride and vinyl acetate known as "VMCH"—60. | methyl ethyl ketone—200. |
| 5 | 100 | Copolymer of vinyl chloride and vinyl acetate known as "VMCH"—20. | methyl ethyl ketone—200. |
| 6 | 100 | Copolymer of vinyl chloride and vinyl acetate known as "VMCH"—20. | acetone—100. |
| 7 | 100 | Copolymer of vinyl chloride and vinyl acetate known as "VMCH"—20. | acetone—50 and methyl ethyl ketone—50. |
| 8 | 100 | Polyvinyl butyral—10. | ethyl alcohol—200. |
| 9 | 100 | Polyvinyl butyral—5. | ethyl alcohol—100. |
| 10 | 100 | Polyvinyl butyral—20. | ethyl alcohol—200. |
| 11 | 100 | Ethyl cellulose—5. | methyl ethyl ketone—100. |
| 12 | 100 | Ethyl cellulose—20. | methyl ethyl ketone—100. |
| 13 | 100 | Ethyl cellulose—20. | methyl ethyl ketone—200. |
| 14 | 100 | Ethyl cellulose—20. | methyl ethyl ketone—300. |
| 15 | 100 | "Lucite polymerized methyl methacrylate"—50. | benzene—200. |
| 16 | 100 | "Lucite polymerized methyl methacrylate"—5. | benzene—100. |
| 17 | 100 | "Lucite polymerized methyl methacrylate"—20. | benzene—100. |
| 18 | 100 | Polyvinyl Acetate—20. | Methyl ethyl ketone—100. |
| 19 | 100 | Polyvinyl Acetate—20. | Methyl ethyl ketone—200. |
| 20 | 100 | (Saran F-120 copolymer of vinyl and vinylidene chlorides)—20. | methyl ethyl ketone—100. |
| 21 | 100 | Copolymer of vinyl chloride and vinyl acetate known as "VYNS"—20. | Methyl ethyl ketone—100. |
| 22 | 100 | Copolymer of vinyl chloride and vinyl acetate known as "VYNS"—20. | Methyl ethyl ketone—200. |
| 23 | 100 | Cellulose acetate butyrate known as "Hercos C"—20. | Methyl ethyl ketone—100. |
| 24 | 100 | Nitrocellulose—20. | ethyl acetate—100. |
| 25 | 100 | Mazein—20. | ethyl alcohol—100. | solid cellulose ether and trioxane, said coating being of macrocrystalline design.

6. A base, a coating on a surface of said base, said coating being the combination of a normally solid cellulose ester and trioxane, said coating being of macrocrystalline design.

7. A base, a coating on a surface of said base, said coating being the combination of a normally solid copolymer of vinyl chloride and vinyl acetate and trioxane, said coating being of macrocrystalline design.

8. A base, a coating on a surface of said base, said coating being the combination of a normally solid polyvinyl butyral and trioxane, said coating being of macrocrystalline design.

9. A base, a coating on a surface of said base, said coating being the combination of a normally solid ethyl cellulose and trioxane, said coating being of macrocrystalline design.

10. A base, a coating on a surface of said base, said coating being the combination of a normally solid polyvinyl acetate and trioxane, said coating being of macrocrystalline design.

11. A base, a coating on a surface of said base, said coating being the combination of a normally solid nitrocellulose and trioxane, said coating being of macrocrystalline design.

PETER ARCIDIACONO.

REFERENCES CITED

The following references are of record in the file of this patent:

UNITED STATES PATENTS

| Number | Name | Date |
| --- | --- | --- |
| 2,399,456 | Yates et al. | Apr. 30, 1946 |

OTHER REFERENCES

Formaldehyde, by J. F. Walker; published in 1944 by the Reinhold Publishing Corp., New York, page 96.